US008805361B2

(12) United States Patent
Kieselmann et al.

(10) Patent No.: US 8,805,361 B2
(45) Date of Patent: Aug. 12, 2014

(54) METHOD FOR SELF-PROVISIONING OF SUBSCRIBER DATA IN THE IP MULTIMEDIA SUBSYSTEM (IMS)

(75) Inventors: Gerhard Kieselmann, München (DE); Martin Konecny, Kurim (CZ); Markus Schott, München (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 982 days.

(21) Appl. No.: 12/281,451

(22) PCT Filed: Feb. 27, 2007

(86) PCT No.: PCT/EP2007/051826
§ 371 (c)(1),
(2), (4) Date: Sep. 2, 2008

(87) PCT Pub. No.: WO2007/099090
PCT Pub. Date: Sep. 7, 2007

(65) Prior Publication Data
US 2009/0023443 A1     Jan. 22, 2009

(30) Foreign Application Priority Data
Mar. 1, 2006  (EP) .................................. 06004161

(51) Int. Cl.
*H04W 4/00*     (2009.01)
(52) U.S. Cl.
USPC ...................... 455/432.3; 455/410; 455/435.1; 455/436; 455/450; 370/328; 370/338
(58) Field of Classification Search
CPC ........... H04W 8/12; H04W 8/18; H04W 8/04; H04W 48/16; H04L 65/1016; H04L 65/1006; H04L 29/12905; H04L 61/6054; H04Q 2213/13098

USPC ............ 455/432.2, 432.1–433, 435.1–435.3, 455/432.1–433, 435.1–435.3, 410, 455/418–419, 436, 450; 370/328–338
See application file for complete search history.

(56) References Cited

U.S. PATENT DOCUMENTS

2004/0132449 A1* 7/2004 Kowarsch .................. 455/432.1
2004/0153667 A1* 8/2004 Kastelewicz et al. ......... 713/201
(Continued)

FOREIGN PATENT DOCUMENTS

| EP | WO 2004/054302 | * | 6/2004 |
| WO | 2004019640 A1 | | 3/2004 |
| WO | 2004054302 A1 | | 6/2004 |

OTHER PUBLICATIONS

Rosenberg et al., "RFC 3261—SIP: Session Initiation Protocol", IEFT Request for Comments, Jun. 2002, pp. 1-269, Jun. 2002.

(Continued)

*Primary Examiner* — Quan M Hua
(74) *Attorney, Agent, or Firm* — Laurence A. Greenberg; Werner H. Stemer; Ralph E. Locher (57) ABSTRACT A method for self-provisioning of subscriber data allows efficient registration of a subscriber for an Internet-Protocol Multimedia Subsystem of a telecommunication network at the subscriber database of the Internet-Protocol Multimedia Subsystem. A subscription entry is created in the subscriber database of the Internet-Protocol Multimedia Subsystem of a telecommunication network, based on prior secure identification of the subscriber by the access network that grants access to the Internet-Protocol Multimedia Subsystem.

14 Claims, 3 Drawing Sheets

(56) References Cited

U.S. PATENT DOCUMENTS

2005/0009520 A1* 1/2005 Herrero et al. ............. 455/435.1
2005/0020259 A1* 1/2005 Herrero ...................... 455/433
2005/0090235 A1* 4/2005 Vermola et al. ............ 455/414.3
2007/0055874 A1* 3/2007 Phan-Anh et al. ........... 713/168

OTHER PUBLICATIONS

Niemi et al., "Hypertext Transfer Protocol (HTTP) Digest Authentication Using Authentication and Key Agreement (AKA)", pp. 1-18, Sep. 2002.

Franks et al., "HTTP Authentication: Basic and Digest Access Authentication" RFC 2617, Obsoletes 2069, Category: Standards Track, Jun. 1999.

3GPP TR 33.978 V6.1.0, 3rd Generation Partnership Project; Technical Specification Group Services and System Aspects; Security aspects of early IP Multimedia Subsystem (IMS) (Release 6) (Jun. 2005).

3GPP TS 29.228 V5.12.0, 3rd Generation Partnership Project; Technical Specification Group Core Network and Terminals; IP Multimedia (IM) Subsystem Cx and Dx interfaces; Signalling flows and message contents (Release 5) (Jun. 2005).

3GPP Eis! TS 129 229 V6.6.0, Digital cellular telecommunications system (Phase 2+); Universal Mobile Telecommunications System (UMTS); Cx and Dx interfaces based on the Diameter protocol; Protocol details (Release 6) (Jun. 2005).

* cited by examiner

FIG 1

METHOD FOR SELF-PROVISIONING OF SUBSCRIBER DATA IN THE IP MULTIMEDIA SUBSYSTEM (IMS)

BACKGROUND OF THE INVENTION

Field of the Invention

The invention concerns methods and devices for subscriber registration in a cellular mobile telecommunication network.

Mobile operators start to extend their service offers with services provided via the IP-based Multimedia Subsystem (IMS) defined in 3GPP standards of release 5 and higher. Before a subscriber can use any IMS-enabled service, however, the Home Subscriber Server (HSS), being the central logical database for subscriber data in 3GPP Rel. >=5 networks, must be provisioned with additional subscriber-related information, e.g. the IMS Private User Identity and IMS Public Identity that are used in the IMS for identification and addressing purposes.

This explicit provisioning step enhances the administration costs of an operator and impedes the fast introduction of new services. Ideally, an existing operator's customer who is interested to use a new service would simply get user equipment (UE) that is capable to provide the new service, and start using it. At maximum, he should be required to perform some simple steps to configure the UE.

Known solutions for supplying a Home Subscriber Server (HSS) with subscriber-related information as e.g. the IMS Private User Identity and IMS Public Identity that are used in the IMS for identification and addressing purposes, are:

The operator's Customer-Care-Center (CCC) creates the IMS subscription data in the HSS before the subscriber is able to register with the IMS and use IMS services.

A disadvantage of this solution is that it is an additional administration step for the operator that enhances the operation costs and is also a barrier for fast and easy introduction, since the user must explicitly contact the operator.

The user herself triggers the provisioning by providing specific information via an operator's web site, e.g. The information given by the user is then taken as input for an automated procedure that creates the IMS subscriber data and provisions the HSS.

A disadvantage of this solution is that the information provided by the user may be erroneous, by intention or inadvertently and that the information must thus be carefully cross-checked and confirmed before being accepted. [The IMS subscriber data are typically also needed to charge for the service.]

BRIEF SUMMARY OF THE INVENTION

It is an object of the invention to efficiently enable supplying a Home Subscriber Server HSS with subscriber-related information that can be used in the IMS for identification and addressing purposes. The object is solved by the invention defined in the independent claims.

The invention concerns a procedure that allows the HSS to provision itself automatically and on-the-fly with IMS subscriber data when a user registers with IMS for the first time. For some services the HSS is able to provision itself with all IMS subscriber data that are required to provide the service; for other services, the mechanism only allows to diminish the amount of information that must be provisioned in an additional explicit provisioning step.

Assumptions

The invention is based on the following assumptions:

The access network (AN) that provides the underlying IP transport connectivity to connect the UE with the IMS is able to authenticate the user. The AN is, for instance, a GPRS or a WLAN network. The assumption is always fulfilled in case of a GPRS access network or the PS domain of a UMTS network.

The UE has been pre-provisioned with all configuration data that enables it to register with the IMS. Details of UE provisioning (by manual or automated means) is not part of this invention. The set of configuration data includes, at least, the IMS domain name, a domain name or IP address to access the P-CSCF, and an IMS public user identity that is used for registration with the IMS. If an authentication procedure is run between the UE and the IMS, the UE needs also to know its IMS private user identity (that is used as "username" in the authentication process) and the secrets (which is a "password" in the simplest case) required to run the authentication.

Figure 1:
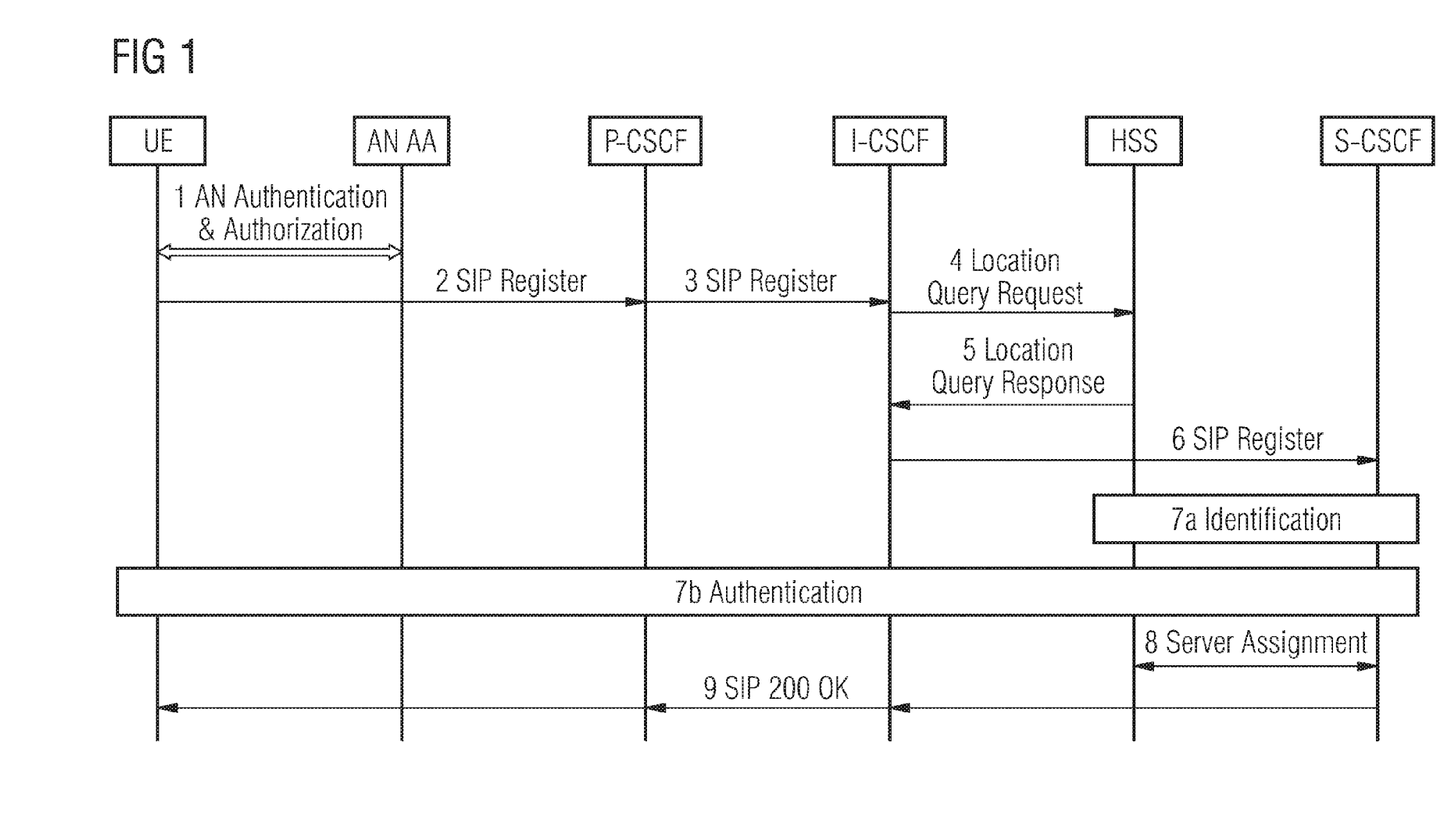
FIG. 1 is a diagram illustrating message flow according to the invention.

The UE registers its public user identity (and binds it to its contact address) through the message flow depicted in FIG. 1. The flow described below holds for the case that the HSS is already provisioned with the subscription data. It is not part of the invention, but defines the frame for the invention.

The invention does not require that the registration process follows the 3GPP specifications in every detail. Only the details specified in the description to FIG. 1 are important. That means, the invention works also and in particular with so-called "early IMS" deployments that follow the general IMS ideas and architecture, but differ in details.

1 Authentication and Authorization by the AN (UE<->AN)

The UE is authenticated by an Authentication and Authorization function (AA) of the AN through any mechanism, and is authorized to establish IP connectivity with the P-CSCF. The authentication is done based on an AN user identifier, whose details depend on the AN and the authentication mechanism.

The UE may also receive relevant IP connectivity parameters (e.g. its own IP address) through this process, but this detail is of no relevance in our context.

Example: If the AN is a GPRS, the UE requests a PDP context from the GGSN, and is also assigned an IP address at this stage. The AN user identifier is the IMSI.

2 SIP: Register (UE➔P-CSCF)

The UE sends a SIP REGISTER message to the P-CSCF in order to register its IMS Public User Identity. The request must be formulated in compliance to RFC 3261 so that the public user identity used for registration is in the To header of the request. If the IMS deployment requires an explicit authentication procedure, and depending on the details of this procedure, the UE may add an Authorization header with a username parameter containing the private user identity.

Example: If the deployed IMS is fully compliant with the 3GPP specifications, the UE must add an Authorization header. If it is an "early IMS" deployment implementing the authentication procedure specified in 3GPP TR 33.978, no Authorization header is sent.

3 SIP: Register (P-CSCF➜I-CSCF)

The P-CSCF forwards the information received with the SIP REGISTER request to the I-CSCF role. Whether the information is conveyed by really forwarding the SIP message or by other means, is irrelevant. For instance, if the I-CSCF role is co-located with the P-CSCF role on the same server, the I-CSCF could access the data via an internal data structure.

4 Location Query Request (I-CSCF➜HSS)

The I-CSCF queries the HSS for information in order to locate the S-CSCF. The request contains, in particular, the public user identity received in the REGISTER request. It may contain the private user identity, if received with the Register request.

Whether the location query request and response is implemented according to the 3GPP specifications TS 29.228 and TS 29.229 or not, is irrelevant for the invention.

5 Location Query Response (HSS➜I-CSCF)

The HSS checks whether a subscriber entry with this public user identity and private user identity (if sent with the request) exists. If so, it sends a positive response that either contains the address of the S-SCCF assigned to that user or other information that allows the I-CSCF to locate an S-CSCF.

6 SIP: Register (I-CSCF➜S-CSCF)

The I-CSCF forwards the information received with the SIP REGISTER request to the S-CSCF role. Whether the information is conveyed by really forwarding the SIP message or by other means, is irrelevant. For instance, if the S-CSCF role is co-located with the I-CSCF role on the same server, the I-CSCF could access the data via an internal data structure.

7a Identification (S-CSCF, HSS)

In some early IMS deployments, the AN is able to prevent IP address spoofing, and the AN AA can provide a trustful relationship between the AN user identifier (see step #1) and the IP address of the UE. The HSS subscriber database, on the other hand, may have the AN user identifier stored together with the corresponding IMS subscription entry. This allows mapping the UE's IP address one-to-one to the subscription entry in the HSS and, in particular, to the private and public user identities of this subscription entry. The SIP REGISTER message received in step #6 contains a public user identity (and possibly a private user identity) as well as the true IP address used by the UE. The S-CSCF is then able to safely identify the user by its IP address. If the user would use a falsified public user identity in the SIP REGISTER request, the S-CSCF would denote this and reject the request.

Details of the communication between AN AA, HSS, and S-CSCF that are needed to exchange the required information and perform the data mapping are irrelevant here.

This step is optional, if a real authentication procedure (step #7b) is executed.

Example: This principle is used, for instance, in the international patent WO 2004/019640 A1 and in 3GPP TS 33.978.

7b Authentication (UE<->S-CSCF)

In other IMS deployments, an authentication procedure is run between the UE and the S-CSCF, for instance HTTP Digest (RFC2617) or Digest AKA (RFC 3310). This requires that the UE and the S-CSCF share the same secrets. In this case, step #7a is not required, so that step #7a and #7b are alternative options. The details of the step that require another round of SIP messages to be exchanged, is of no importance for this invention.

In some deployments, step #7b is run in addition to step #7a. This is done, for instance, if the program code in the UE fails without the authentication sequence. In this case, dummy secrets are typically used that are identical for all UE.

This is similar to the authentication procedure often run by Internet service providers during PPP connection set-up. They identify the user via the phone number and use a published dummy password during the PPP connection set-up, only for formal reasons to guarantee that the code of the access programs will work correctly.

8 Service Assignment (S-CSCF<->HSS)

The S-CSCF requests the service profiles and the list of all public user identities associated with the registration (the so-called implicitly registered public user identities).

9 SIP: 200 OK (S-CSCF➜I-CSCF➜P-CSCF➜UE)

The S-CSCF acknowledges the registration attempt. The implicitly registered public user identities are conveyed to the UE in the P-Associated-URI header.

According to an embodiment of the invention the HSS creates, on the fly, a subscription entry in its database during the first registration attempt of the user. In current IMS networks, that only implement the procedures as sketched in FIG. 1 and explanations to that figure, such a request would be rejected.

For an embodiment of the invention it is further described under which conditions HSS self-provisioning is possible, and according to which rules the subscription is constructed. This is described in FIG. 2 with further explanations that build upon the sequence of activities from FIG. 1.

Figure 2:
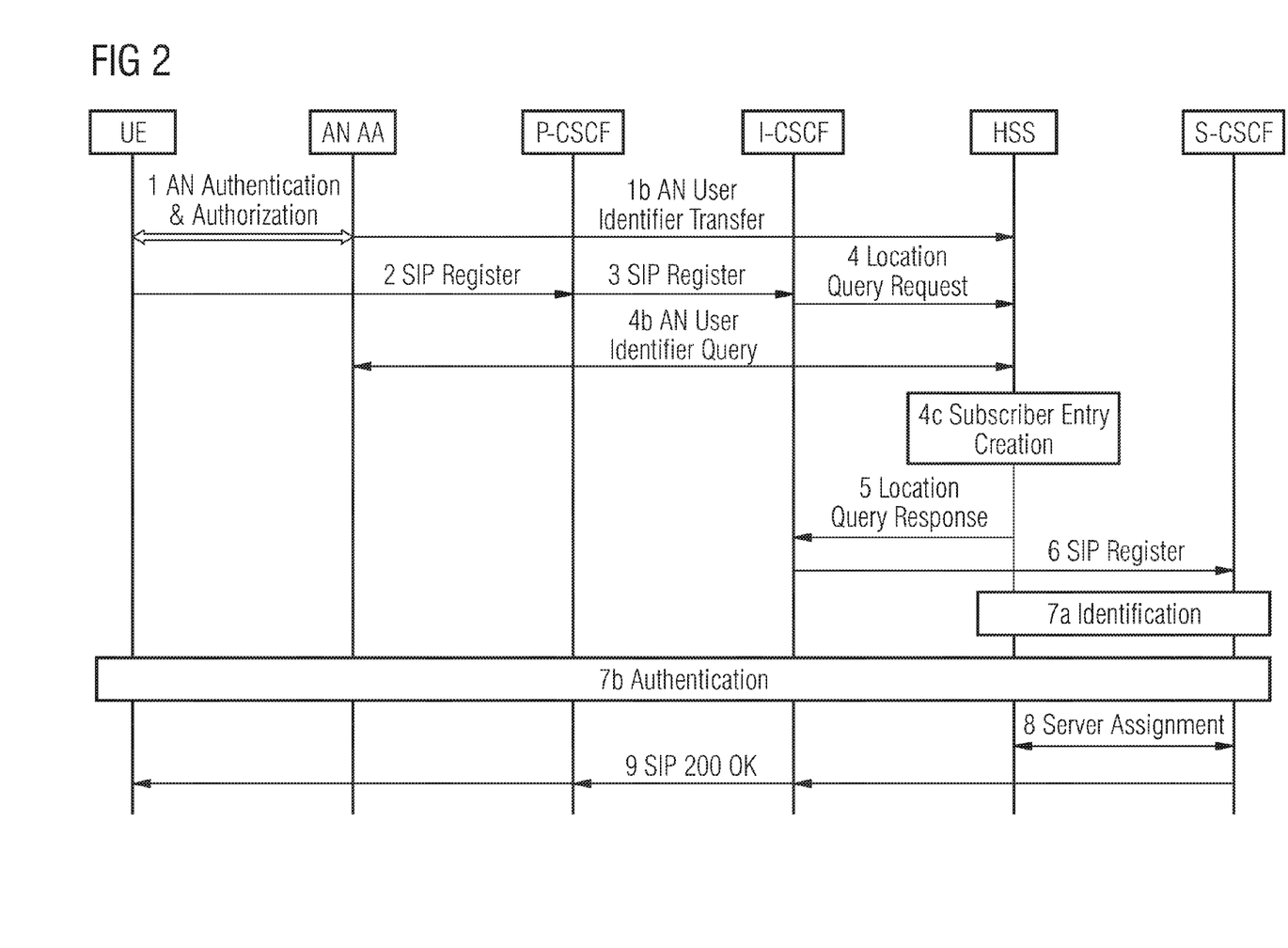
FIG. 2 is a diagram illustrating message flow according to the invention.

1b AN User Identifier Transfer

After the user of the UE has been authenticated by the AN AA function, a unique AN user identifier is transferred to the HSS. This identifier must also be known to the UE, via pre-configuration, manual query in step #2 below, or any other means.

[In addition, if step "7a Identification" is executed, the IP address of the UE must be transferred in addition with the AN user identifier, as has been stated already in the description to step #7a in the Assumptions section.]

This step and step #4b are alternatives from one another.

Example: In the GPRS access network, the AN AA is represented by the GGSN. The unique user identifier could be the IMSI, for instance. The IMSI is also accessible to the UE, since it is stored in the SIM or USIM module. Depending on details of the operator's network deployment, the MSISDN could also serve as identifier. This is less probable for several reasons, but not excluded by this invention.

2 SIP: Register (UE➜P-CSCF)

The invention requires that the public user identity used by the UE in this first registration must be a SIP URI sip:user-part@operator-domain, whose user-part is constructed in a well-defined way from the AN user identifier. The construction principle must be known to the HSS. The UE does either not send an Authentication header with the request, or it sends an Authentication header with the username parameter set to any syntactically correct value.

Alternatively, the UE may use any syntactically correct string as user-part of the public user identity, and insert an Authentication header with the username parameter set to a private user identity that is constructed in a well-defined way from the AN user identifier.

It is implementation-defined, which alternative is implemented, or if both alternatives co-exist.

Example: In combination with a GPRS access network and the IMSI as AN user identifier, the public user identity could be of the form sip:imsi-value@operator-domain. In the $2^{nd}$ alternative, the username parameter could be set to the IMSI value, and all UEs could, for instance, use the same public user identity in this step, e.g.: sip:dummy@operator.net.

4 Location Query Request (I-CSCF➔HSS)

The HSS retrieves the AN user identifier from either the Public User Identity or Private User Identity, depending on the alternative chosen in step #2. The HSS searches its database for a subscriber entry containing the AN user identifier. The AN user identifier could be a separate data item in the subscriber data record, or could be derivable from another data item of the subscriber data record, from the private user identity, for instance.

If the HSS does find such a subscriber entry, the registration procedure is further executed as was described in the comments to FIG. 1.

If the HSS does not find such a subscriber entry, it checks whether a user with this AN user identifier is currently authorized by the AN to access the IMS. If the AN AA function has already notified the HSS in step #1b, it searches all existing notifications for this AN user identifier.

4b AN User Identifier Query (HSS<->AN AA)

Alternatively to step #1b, the HSS queries the AN AA with the AN user identifier retrieved in step #4 as input. If a UE with this AN user identifier is currently authorized to access the IMS via the AN, the AN AA answers the query with a positive response. In case that step #7a Identification shall be executed, the query response must also contain the IP address of the UE.

Example: The HSS could execute an LDAP query.

4c Subscriber Entry Creation (HSS)

When the HSS has verified that the AN user identifier received in step #4 belongs to a UE that has been authorized by the AN, the HSS creates a new subscription entry for the subscriber associated with the AN user identifier. The following rules apply:

The private user identity of the subscription entry is created from the AN user identifier. The mapping must be bijective: that means, the algorithm must map the AN user identifier to a unique private user identity, and there must be an inverse map to retrieve the AN user identifier from the private user identity. In most cases, the simplest mapping will be the identity map, i.e., the private user identity is the same as the AN user identifier.

The public user identity of the subscription entry is either set to the public user identity the HSS had received with the Location Query Request, or is created by the HSS from any other data and/or algorithm that guarantees a unique value. The creation procedure must ensure that different subscription entries never have the same public user identity.

In addition, it is possible to generate additional public user identities by any algorithms that guarantee that the generated entries are unique throughout the whole subscription database.

If an authorization procedure is run alternatively to the identification (see step #8 in FIG. 1), the HSS must retrieve the corresponding secrets associated with the AN user identifier from the AN AA or another database in the network that holds this information. If the authorization procedure is executed in addition to the identification procedure, the HSS could do the same or simply create the secret from pre-configured information. This is possible, since in this case (authentication in addition to identification), the authentication is only a pro forma activity, where the same secrets may be used for all subscriptions.

The service profile of the subscription entry is created from a pre-configured service-profile template. Several service-profile templates may be available, and the HSS may select the correct template to use by a mapping rule based on the AN user identifier. If, for instance, the AN user identifier is the IMSI, the HSS could store different service profiles for different IMSI ranges. More complex mapping rules are also possible.

[The service-profile is a collection of service and user-related data. It contains, for instance, filter criteria that define which application servers are invoked on SIP communication requests, and additional service information for these application servers. See 3GPP TS 29.228 for details.]

Example: If the AN is the GPRS, the GGSN acts as AN AA, and the IMSI is used as AN user identifier, the HSS could set the private user identity to the IMSI. In order to create a public user identity, the HSS could query the user's MSISDN from the GGSN, and set the public user identity to sip:msisdn@operator-domain. Let us suppose that a dummy authorization is run in addition to the identification step. The HSS would then populate the HTTP Digest password (the "secret") with a pre-configured value. This value must, of course, also be known to every UE.

Let us assume that the network only supports a single SIP-controlled PoC (Push to Talk over Cellular) service. The service profile would then be created from a single service profile template that was written for this service.

7a Identification (S-CSCF, HSS)
7b Authentication (UE<->S-CSCF)
8 Service Assignment (S-CSCF<->HSS)

These steps run with no modifications required. In fact, the S-SCCF is not even aware that the HSS constructed the subscriber entry on-the-fly.

9 SIP: 200 OK (S-CSCF➔I-CSCF➔P-CSCF➔UE)

This step is also unchanged. The implementation details and operator policies may require that the public user identity that was used during registration is barred for use in the communication phase. If this is the case, a P-Associated-URI header must be contained in the 200 OK response that contains at least one public user identity that can be used for communication. This public user identity had also been constructed in step #4c.

Example: Assume that the public user identity used for registration was constructed out of the IMSI that served as AN user identifier, e.g. as sip:imsi-value@operator-domain. The IMSI is a value that should not become known to other parties, to prevent security attacks. If the HSS is aware of the MSISDN value associated with that URI, it could create another public user identity, e.g. sip:msisdn-value@operator-domain. This value would be returned in the P-Associated-URI header, and the IMSI-derived public user identity used for registration would be barred for communication.

EXAMPLE

The following example shows a practical application of the invention.

The 3GPP specification 3GPP TR 33.978 describes in detail a simplified registration procedure for GPRS access networks, where the authentication procedure is replaced with an identification procedure. This procedure is sometimes called "early-IMS authentication". The procedure does only work, of course, if the HSS is already equipped with all relevant subscription data. The procedure fits in the frame defined by FIG. 1 and explanations.

We can easily enhance this procedure with HSS self-provisioning according to the rules of this invention. The message flows among the network entities remain unchanged; the only difference is that the HSS creates a subscriber profile on the fly, if no such profile exists already. The UE and the CSCF roles are not aware of this self-provisioning procedure.

Figure 3:
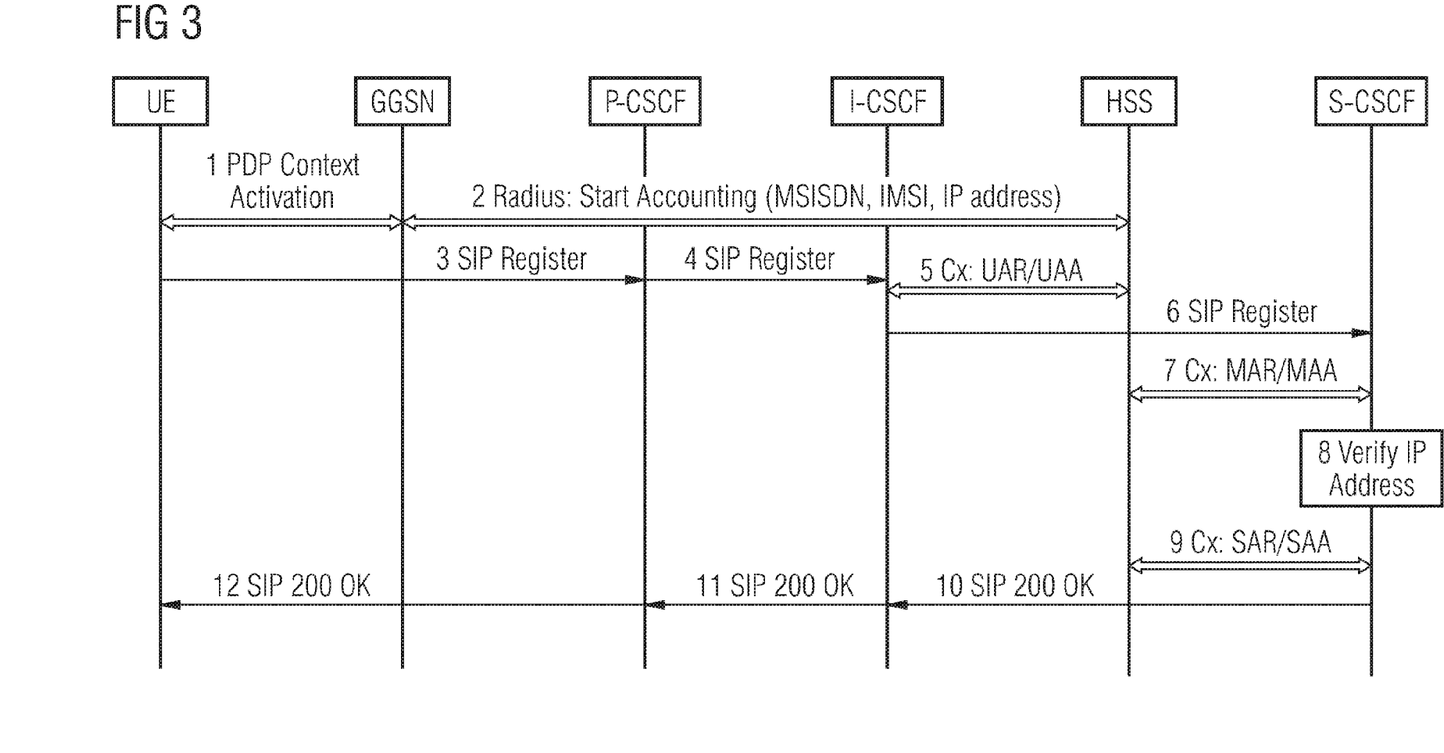
FIG. 3 is a diagram illustrating standard registration procedure in case of early-IMS authentication.

The standard registration procedure in case of early-IMS authentication is depicted in FIG. 3. The reader is assumed to be familiar with that procedure. The explanations to FIG. 3 concentrate on the details relevant for the HSS self-provisioning. Any activities that are additions compared to the standard procedure due to the rules of this invention are marked with NEW.

1 PDP Context Activation

This step corresponds with step #1 from FIG. 2, where the AN is a GPRS. The UE is identified by its IMSI, and an IP address is assigned to it. The GGSN is configured to prevent IP address spoofing.

2 RADIUS Start Accounting (GGSN<->HSS)

With this message, the GGSN reports the MSISDN, the IP address, and the IMSI of the UE.

If a subscriber entry with this MSISDN exists, auto-provisioning is not activated, and the ordinary authentication procedures are executed, as explained in 3GPP TR 33.978.

NEW: If no subscriber profile with this MSISDN exists, the HSS stores this data tuple in a list of Radius data.

3 SIP Register (UE➔P-CSCF)

It is required by 3GPP TR 33.978 that the UE constructs the Public User Identity from the IMSI stored in the SIM or USIM, according to the following rule:
Public User Identity: sip: [imsi]@ims.mnc[mnc].mcc[mcc].3gppnetwork.org
where: [imsi] is the IMSI value, [mnc] is the mobile network code derived from the IMSI and filled on the left with "0" digits to yield a 3-digit number, and [mcc] is the mobile country code.

This fits to the rule of the invention that the user-part of the public user identity is derived from the AN user identifier, which is the IMSI in this case. No Authorization header is sent with the Register request.
Example for the public user identity:
sip:
234150999999999@ims.mnc015.mcc234.3gppnetwork.org
5 Cx UAR/UAA (I-CSCF<->HSS)

This step corresponds with the sequence of steps #4, #4c, and #5 in FIG. 2.

As required by 3GPP TR 33.978, the I-CSCF sends a UAR (as location query request) containing the private and public user identity:
Private User Identity:
[imsi]@ims.mnc[mnc].mcc[mcc]0.3gppnetwork.org
Public User Identity: sip: [imsi]@ims.mnc[mnc].mcc[mcc].3gppnetwork.org
NEW:

Through the [imsi] value, the HSS is able to identify the corresponding {IMSI, MSISDN, IP address} tuple it received with Message 2. The HSS then creates a new subscriber profile for the private user identity
[imsi]@ims.mnc[mnc].mcc[mcc].3gppnetwork.org
with the public user identity set to
sip:x[msisdn]@[operator-domain].
Example: sip:x49898901234567@my-operator.com The service profile is derived from a pre-configured service profile template. Let us assume that the HSS stores several profile templates for several IMSI ranges. To determine the correct template, the HSS checks the IMSI of the new subscriber against the configured IMSI ranges, and uses the appropriate template.
7 Cx MAR/MAA (S-CSCF<->HSS)
8 Verify IP Address (S-CSCF)

These 2 steps correspond with step #7a Identification from FIG. 1 or 2. Step #7b Authentication does not exist in the case.
9 Cx SAR/SAA (S-CSCF<->HSS)

This step corresponds with step #8 from FIG. 1 or 2.
12. SIP 200 OK (P-CSCF→UE)

The UE retrieves, from the P-Associated-URI header, the generated Public User Identity
sip:x[msisdn]@ [operator-domain].

According to 3GPP TR 33.978, the UE must use this public user identity for any SIP conversation during this registration period; the IMSI-derived public user identity used for registration is barred.

The embodiment of the invention discussed above can have the following advantages:

HSS self-provisioning simplifies the introduction of IMS based services for the mass market. The user can buy a terminal and start using it.

Administration costs for the introduction of IMS-based services are reduced, since the operator's customer care center is not required to create individual subscriber entries in the HSS.

The invention allows efficient registration of a subscriber for an Internet-Protocol Multimedia Subsystem of a telecommunication network at the subscriber database (HSS) of the Internet-Protocol Multimedia Subsystem. The invention concerns a method for creating a subscription entry in the subscriber database (HSS) of the Internet-Protocol Multimedia Subsystem of a telecommunication network, based on prior secure identification of the subscriber by the access network that grants access to the Internet-Protocol Multimedia Subsystem.

REFERENCES

3GPP TS 29.228 3GPP TS 29.228: "IP Multimedia (IM) Subsystem Cx and Dx interfaces; Signalling flows and message contents"
3GPP TS 29.229 3GPP TS 29.229: "Cx and Dx interfaces based on the Diameter protocol; Protocol details"
3GPP TR 33.978 3GPP TR 33.978: "Security Aspects of Early IMS (Release 6)"
RFC 2617 IETF RFC 2617: "HTTP Authentication: Basic and Digest Access Authentication"
RFC 3261 IETF RFC 3261: "SIP: Session Initiation Protocol"
RFC 3310 IETF RFC 3310: "Hypertext Transfer Protocol (HTTP) Digest Authentication Using Authentication and Key Agreement (AKA)"
Abbreviations
3GPP 3rd Generation Partnership Project
AA Authentication and Authorization
AKA Authentication and Key Agreement
AN Access Network
CCC Customer Care Center
GGSN Gateway GPRS Support Node
GPRS General Packet Radio Service
HSS Home Subscriber Server
HTTP Hypertext Transfer Protocol
I-CSCF Interrogating Call Session Control Function
IMS IP-based Multimedia Subsystem
IMSI International Mobile Subscriber Identity
IP Internet Protocol MAA Multimedia Authentication Answer
MAR Multimedia Authentication Request
MSISDN Mobile Station International PSTN/ISDN Number
P-CSCF Proxy Call Session Control Function
PDP Packet Data Protocol
PoC Push to Talk over Cellular
PPP Point-to-Point Protocol
PS Packet-switched
RADIUS Remote Authentication Dial In User Service
S-CSCF Serving Call Session Control Function
SAA Server Assignment Answer
SAR Server Assignment Request
SIM Subscriber Identity Module
SIP Session Initiation Protocol
UAA User Authorization Answer
UAR User Authorization Request
UE User Equipment
UMTS Universal Mobile Telecommunication System
URI Uniform Resource Identifier
USIM Universal Subscriber Identity Module
WLAN Wireless Local Area Network

The invention claimed is:

1. A method of creating a subscription entry in a subscriber database of an Internet-Protocol multimedia subsystem, which comprises:
   granting a subscriber access through an access network to the Internet-Protocol multimedia subsystem after securely identifying the subscriber by way of a unique access-network user identifier,
   transmitting by the subscriber the access-network user identifier in a register request of a session initiation protocol to the Internet-Protocol Multimedia Subsystem,
   transmitting, by an interrogating call session control function of the Internet-Protocol multimedia subsystem, the access-network user identifier to the subscriber database;
   determining, by the subscriber database, whether a subscriber entry including the access-network user identifier exists in the subscriber database; and
   upon verifying by the subscriber database that the subscriber is granted access through the access network to the Internet-Protocol multimedia subsystem, and upon determining that the subscriber entry including the access-network user identifier is lacking in the database, creating and storing by the subscriber database a subscription entry concerning the subscriber by creating a new pair of unique private and public identifiers.

2. The method according to claim 1, which comprises:
   sending by an access device a message with subscriber identification data to the subscriber database, when the subscriber registers for a first time at the access device for the Internet-Protocol multimedia subsystem.

3. The method according to claim 1, wherein the access-network user identifier transmitted in the register request of a session initiation protocol is not identical to the identifier used by the access network to identify the subscriber, a map is used to derive the access-network user identifier used by the access network from the access-network user identifier transferred in the register request of a session initiation protocol and the map is used by the subscriber database.

4. The method according to claim 1, which comprises checking by the subscriber database with the authentication-and-authorization function of the access-network, whether the access-network user identifier received via the Internet-Protocol Multimedia Subsystem is currently authorized to access the Internet-Protocol Multimedia Subsystem, before creating and storing the subscription entry for the subscriber, in a situation where no subscriber profile exists.

5. The method according to claim 1, wherein the access-network user identifier used by the access network comprises an international mobile subscriber identity or a mobile station international ISDN number associated with the subscriber.

6. A home subscriber server, comprising a processor configured to:
   receive a location query request for a user;
   retrieve from the location query request an access network user identifier relating to the user in response to the user registering for the first time at a access device for an Internet Protocol multimedia subsystem;
   search whether a subscriber entry including the access network user identifier is found in a home subscriber server database;
   upon determining that the subscriber entry including the access-network user identifier is lacking in the home subscriber server database, perform a check, based on the access network user identifier, whether the user associated with the access network user identifier is authorized by the access network to access the Internet Protocol multimedia subsystem; and
   create a subscriber entry by creating a new pair of unique private and public identifiers for the user upon determining that the result of the check shows that the user associated with the access network user identifier has been authorized to access the Internet Protocol multimedia subsystem.

7. The home subscriber server according to claim 6, which is further configured to receive, from the access network, the access network user identifier relating to the user, and wherein the check comprises checking the received access network user identifier.

8. The home subscriber server according to claim 6, wherein the check comprises querying the access network with the access network user identifier as input.

9. The home subscriber server according to claim 8, wherein the check comprises receiving a response to the query and the result of the check is determined based on the response.

10. The home subscriber server according to claim 6, wherein the access network user identifier comprises one of an international mobile subscriber identity and mobile station international ISDN number.

11. The home subscriber server according to claim 6, wherein the device is configured to retrieve the access network user identifier from a public user identity of the user received in the location query request.

12. The home subscriber server according to claim 6, wherein the device is configured to create the subscriber entry by performing at least one of the following steps:
   creating a private user identity of the subscriber entry based on the access network user identifier; and/or
   setting a public user identity of the subscriber entry as a public user identity of the user received in the location query request; and/or
   creating a service profile of the subscriber entry from a pre-configured service profile template.

13. The home subscriber server according to claim 6, wherein the receiving from the access network comprises receiving an international mobile subscriber identity, a mobile station international ISDN number, and an IP address, and wherein the home subscriber server is further configured to store the international mobile subscriber identity, the mobile station international ISDN number, and the IP address, in a situation where a subscriber entry associated with the mobile station international ISDN number is lacking in the home subscriber server.

14. The method according to claim 1, wherein the step of creating the subscription entry includes at least one step selected from the group consisting of:
- creating a private user identity of the subscription entry based on the access network user identifier,
- setting a public user identity of the subscription entry as a public user identity of the user received in a location query request, and
- creating a service profile of the subscription entry from a pre-configured service profile template.

* * * * *